US012771601B2

(12) United States Patent
Quilbeuf et al.

(10) Patent No.: US 12,771,601 B2
(45) Date of Patent: Oct. 20, 2026

(54) NETWORK DEVICE AND METHOD FOR TRACING DEVICE CONFIGURATIONS

(71) Applicant: HUAWEI TECHNOLOGIES CO., LTD., Shenzhen (CN)

(72) Inventors: Jean Quilbeuf, Dublin (IE); Benoit Claise, Dublin (IE)

(73) Assignee: Huawei Technologies Co., Ltd., Shenzhen (CN)

( * ) Notice: Subject to any disclaimer, the term of this patent is extended or adjusted under 35 U.S.C. 154(b) by 87 days.

(21) Appl. No.: 19/012,637

(22) Filed: Jan. 7, 2025

(65) Prior Publication Data

US 2025/0150342 A1 May 8, 2025

Related U.S. Application Data

(63) Continuation of application No. PCT/EP2022/068824, filed on Jul. 7, 2022.

(51) Int. Cl.
*H04L 41/085* (2022.01)

(52) U.S. Cl.
CPC .................................. *H04L 41/085* (2013.01)

(58) Field of Classification Search
None
See application file for complete search history.

(56) References Cited

U.S. PATENT DOCUMENTS

2019/0140906 A1* 5/2019 Furuichi ................. G06F 16/27
2020/0287788 A1 9/2020 Triplet et al.

FOREIGN PATENT DOCUMENTS

WO 2021245447 A1 12/2021

OTHER PUBLICATIONS

Wu et al., "Service Models Explained," Internet Engineering Task Force (IETF), RFC 8309, Total 23 pages (Jan. 2018).
Bjorklund et al., "The YANG 1.1 Data Modeling Language," Internet Engineering Task Force (IETF), RFC 7950, Total 217 pages (Aug. 2016).
Enns Ed. et al., "Network Configuration Protocol (NETCONF)," Internet Engineering Task Force (IETF), RFC 6241, Total 113 pages (Jun. 2011).

(Continued)

*Primary Examiner* — Cai Y Chen
(74) *Attorney, Agent, or Firm* — Leydig, Voit & Mayer, Ltd.

(57) ABSTRACT

Devices and methods for tracking device configuration changes in a network are provided. The network comprises a client adapted to generate, in response to configuration data, a device configuration change. Then, the client pushes the device configuration change, along with a unique ID and a client ID to a server. The unique ID may be a transaction ID. The client stores the unique ID as a southbound ID in combination with metadata of the configuration data in its configuration history. Correspondingly, the server stores the unique ID received from the client as a northbound ID in combination with the client ID and metadata of the received device configuration change in its configuration history. In this way, the device configuration change pushed to the server can be traced based on the unique ID and the client ID.

15 Claims, 9 Drawing Sheets

(56) References Cited

OTHER PUBLICATIONS

Lindblad, "Transaction ID Mechanism for NETCONF draft-lindblad-netconf-transaction-id-01," Internet-Draft, IETF, Total 22 pages (Oct. 2021).

"Configuration Management Commands on Cisco IOS XR Software," Cisco, [online], https://www.cisco.com/c/en/us/td/docs/routers/xr12000/software/xr12k_r3-9/system_management/command/reference/yr39xr12k_chapter5.html, Total 65 pages (Downloaded on Dec. 27, 2024).

Bierman et al: "Network Configuration Access Control Model," Internet Engineering Task Force (IETF), RFC 8341, Total 58 pages (Mar. 2018).

* cited by examiner

NETWORK DEVICE AND METHOD FOR TRACING DEVICE CONFIGURATIONS

CROSS-REFERENCE TO RELATED APPLICATIONS

This application is a continuation of International Application No. PCT/EP2022/068824, filed on Jul. 7, 2022, the disclosure of which is hereby incorporated by reference in its entirety.

TECHNICAL FIELD

Embodiments of the present disclosure generally relate to the field of communications technologies, in particular, relate to devices and methods for tracing device configurations in networks.

BACKGROUND

Managing a large-scale network requires maintaining and updating a large number of network equipment or network elements (NEs). Updating device configurations of the NEs is needed, for instance, to enable a network service for a new customer. Doing this device configuration update manually is error-prone and tedious.

To circumvent the problem of manual update, network management systems (NMSs) are used by automating device configuration update from a higher-level abstraction, such as a notion of service. The NMSs may comprise orchestrators and controllers, which are adapted to transform a high-level configuration of a service into a low-level configuration of a NE. The NMSs usually update device configurations of the NEs using network configuration protocols, such as Network Configuration Protocol (NETCONF) or Representational State Transfer Configuration Protocol (RESTCONF). The YANG data modeling language is a data modeling language used to model service and/or configuration data for network management protocols.

In a large-scale network, several NMSs may coexist to handle various aspects of the network. Day-to-day maintenance may still require network engineers manually modify device configurations of specific NEs. Configuration changes that are automatically updated in the network may introduce unforeseen troubles and service disruptions, such as due to an incorrect configuration, conflicting configurations from different NMSs, conflicting intents from an NMS, etc.

Conventionally, a network element, a controller, and an orchestrator save a history of configuration changes locally. The history of configuration changes normally only comprises local information such as a timestamp, user account, protocol, etc. In different network systems, the history of configuration changes may be referred to as a configuration commit list or configuration checkpoints.

A network malfunction is normally caused by an incorrect or conflicting device configuration applied to a network element. As stated earlier, each NE only has information about the name of the user who triggered the change, the protocol used to change the configuration, and the timestamp of the configuration change. The information about why this configuration change was made is usually not available. Therefore, starting from a network element, it is not easy to track back to the service request, nor to mention it is not immediate to know whether the change in the service request was initiated by an external user outside the network or by automation software inside the network.

If a configuration change on a NE was performed by automation software of an NMS, finding out why the automation software did the configuration change often requires correlating several sources of information in order to match a configuration change in the NMS to a particular configuration change on the NE. For instance, if the change has been done on the NE via NETCONF, a network engineer may need to check both the configuration history of the NE and the configuration history of the controller in order to see if some entries could match. Then, based on the timestamp, a corresponding entry could be found in the configuration history of the controller. This entry may include some useful information to identify why the device configuration was changed at that time. If necessary, a correction may be made accordingly. However, such a mechanism requires a network engineer to collate several sources of information and is time-consuming. It is also too complex to be implemented in an automated way. Moreover, there are usually a number of controllers configuring a number of network elements in the network, every possible pair of a controller and a network element may need to be checked.

Therefore, it is difficult to trace a configuration change applied to a network element back to a root cause triggering this configuration change. The root cause may be a service request that automatically triggered the configuration change, or a change manually initiated by a user.

SUMMARY

In view of the above, embodiments of this disclosure provide a solution to improve the traceability of device configuration changes in a network. Embodiments of this disclosure further provide a solution to map a device configuration change to its original root cause, and to facilitate root cause analysis and self-healing in the network in case of malfunctioning.

A first aspect of this disclosure provides a configuration sending device. The configuration sending device is configured to generate a device configuration based on configuration data, and a configuration metadata of the configuration data. The configuration sending device is further configured to generate a unique identifier (ID) associated with the configuration metadata. Then, the configuration sending device is configured to store the configuration metadata in combination with the unique ID. Then, the configuration sending device is configured to send the device configuration, the unique ID, and a configurator ID identifying the configuration sending device to a configuration receiving device.

Optionally, the configuration sending device may be configured to obtain the configuration data before generating the device configuration. The configuration data may be understood as a model comprising a relative high-level configuration for the configuration receiving device. The configuration sending device may be configured to translate the configuration data into the device configuration of the configuration receiving device. That is, the device configuration is transformed by the configuration sending device into the device configuration that can be applied directly to the configuration receiving device.

Optionally, the device configuration may comprise one or more new parameters of the configuration receiving device. Alternatively or additionally, the device configuration may comprise one or more updated parameters of the configuration receiving device. In the present disclosure, the device configuration may also comprise a device configuration change.

Optionally, the configuration sending device may be a client of a network configuration protocol, such as a NETCONF client or a RESTCONF client. In this disclosure, the configuration sending device may be simply referred to as a "client". Accordingly, the configurator ID identifying the configuration sending device may be referred to as a "client ID". The configuration receiving device may be a server of a network configuration protocol, or may be a network device running such a server. For example, the configuration receiving device may be a NETCONF server or a RESTCONF server. In this disclosure, the configuration receiving device may be simply referred to as a "server".

Optionally, the unique ID may comprise a value that is at least unique within the client. Alternatively, the unique ID may comprise a value that is unique in the network.

By storing the unique ID with the configuration metadata in the client, and sending the unique ID and the configurator ID along with the device configuration to the server, the client may create a link or an association between the client and the server for this device configuration. Based on this unique ID and the configurator ID, this device configuration may be traced back to the associated configuration metadata stored in the client, and finally back to the corresponding configuration data. Thus, an explicit and reliable mechanism can be provided to map a configuration change on a server to a corresponding configuration data on a client, based on the unique ID and the configurator ID.

Optionally, the unique ID and the configuration metadata may be stored as a single record of a configuration history of the client.

In an implementation form of the first aspect, the unique ID may comprise a transaction ID.

Optionally, the transaction ID may be a unique ID shared between the server and the client for each device configuration transaction. The transaction ID may be further used for synchronization between the server and the client. Optionally, the transaction ID may be an extension of NETCONF protocol.

By using the transaction ID as the unique ID to associate the configuration metadata, the transaction ID that may be used for configuration synchronization may be re-used for mapping a configuration change to the configuration data. Therefore, no additional ID needs to be created and the signalling overhead may be further reduced.

In an implementation form of the first aspect, the configuration data may comprise a service request.

Optionally, the service request may comprise information on the deployment and/or implementation request of a service. The client may be further configured to transform the service request into the device configuration that enables the server to deliver the requested service. The device configuration may comprise one or more configuration and operational parameters, or changes of the one or more configuration and operational parameters.

Optionally, the service request may be obtained from a network device of a higher level with respect to the configuration sending device. Alternatively, the service request may be generated by a network operator, or an operations support system (OSS)/business support system (BSS). Alternatively, the service request may be manually input.

By mapping the device configuration to the service request through the unique ID, it can be easily determined which service request triggers the device configuration, and whether the service request is automatically generated within the network or manually input by an external user (or customer). Therefore, it helps self-healing of the network during root cause analysis (RCA).

In an implementation form of the first aspect, the configuration metadata may comprise one or more of:

a configuration ID, a timestamp, user information, and a method for performing the device configuration.

The configuration ID may be an ID that is unique within the client and uniquely identify the configuration data on the client. The configuration ID may also be referred to as a commit ID. The method for performing the device configuration may comprise command-line interface (CLI), SMP, NETCONF, and RESTCONF.

Optionally, the client may be further configured to store the configuration data.

In an implementation form of the first aspect, the configuration sending device may be a network orchestration entity adapted to send the device configuration to a network controller as the configuration receiving device.

The network orchestration entity may also be referred to as an orchestrator. The orchestrator may be adapted to instruct one or more network controllers and may have a wider view of a part of or the whole network than the one or more network controllers.

In an implementation form of the first aspect, the configuration sending device may be a network controller adapted to send the device configuration to a network element as the configuration receiving device.

A second aspect of this disclosure provides a configuration receiving device. The configuration receiving device is configured to receive, from a configuration sending device, a device configuration, a unique ID associated with the device configuration, and a configurator ID identifying the configuration sending device. Then, the configuration receiving device is configured to generate a configuration metadata of the device configuration, and store the configuration metadata in combination with the unique ID and the configurator ID.

The configuration receiving device may be further configured to apply the device configuration. By storing the configuration metadata in combination with the unique ID and the configurator ID, the device configuration applied to the server can be retroactively mapped to a corresponding configuration data on the client. Thus, it helps to find out for what reason the device configuration is triggered. Therefore, it may facilitate self-healing of the network during RCA.

In an implementation form of the second aspect, the unique ID may comprise a transaction ID. Optionally, the server may be further configured to synchronize device configuration with the client based on the transaction ID.

In an implementation form of the second aspect, the configuration metadata may comprise one or more of:

a configuration ID identifying the device configuration, a timestamp, user information, and a method for performing the device configuration.

The configuration ID may be an ID that is unique only on the server and uniquely identify the corresponding device configuration on the server. The method for performing the device configuration may comprise CLI, SMP, NETCONF, and RESTCONF.

In an implementation form of the second aspect, the configuration receiving device may be a network controller adapted to receive the device configuration from a network orchestration entity as the configuration sending device.

In an implementation form of the second aspect, the configuration receiving device may be a network element adapted to receive the device configuration from a network controller as the configuration sending device.

A third aspect of this disclosure provides a system. The system comprises one or more configuration sending devices according to the first aspect or any implementation forms thereof, and one or more configuration receiving devices according to the second aspect or any implementation forms thereof.

In an implementation form of the third aspect, the system may comprise at least one network orchestration entity, at least one network controller, and at least one network element.

It is noted that the at least one network orchestration entity may be coupled to the at least one network controller. The at least one network controller may be coupled to the at least one network element. That is, the at least one network orchestration may act as a client with respect to the at least one network controller as a server. The at least one network controller may act as a client with respect to the at least one network element as a server.

A fourth aspect of this disclosure provides a use of the system. The use is for tracing device configurations in a communications network. The use comprises the following steps:

- sending a request for querying configuration changes to a configuration receiving device;
- receiving one or more pieces of configuration metadata of one or more device configurations;
- identifying target configuration metadata of a target device configuration;
- obtaining a unique ID associated with the target configuration data, and a configurator ID identifying a configuration sending device;
- sending a request for querying configuration changes to a configuration sending device based on the configurator ID;
- identifying a corresponding configuration data stored on the configuration sending device based on the unique ID.

Optionally, the use may be performed by an analysis entity of the network, the analysis entity may be adapted to perform root cause analysis.

In an implementation form of the fourth aspect, the identified configuration data may comprise a service request or a change request of an existing service.

By using the unique ID to retroactively trace the target device configuration change back to the configuration data, the root cause triggering the target device configuration may be easily and explicitly identified. If the configuration data comprising the service request is automatically generated, a corresponding repair may be performed. If the configuration data is manually input, e.g., by an external user outside the network, then, it can be identified that the root cause comes from outside of the network. A corresponding repair may also be performed.

A Fifth Aspect of this Disclosure Provides a Method Comprising the Following Steps:

- generating, by a configuration sending device, a device configuration based on configuration data;
- generating, by the configuration sending device, a configuration metadata of the configuration data;
- generating, by the configuration sending device, a unique ID associated with the configuration metadata;
- storing, by the configuration sending device, the configuration metadata in combination with the unique ID; and
- sending, by the configuration sending device, the device configuration, the unique ID, and a configurator ID identifying the configuration sending device to a configuration receiving device.

In an implementation form of the fifth aspect, the unique ID may comprise a transaction ID.

In an implementation form of the fifth aspect, the configuration data may comprise a service request.

In an implementation form of the fifth aspect, the configuration metadata may comprise one or more of:

- a configuration ID,
- a timestamp,
- user information, and
- a method for performing the device configuration.

In an implementation form of the fifth aspect, the configuration sending device may be a network orchestration entity adapted to send the device configuration to a network controller as the configuration receiving device.

In an implementation form of the fifth aspect, the configuration sending device may be a network controller adapted to send the device configuration to a network element as the configuration receiving device.

The method of the fifth aspect and its implementation forms may achieve the same advantages and effects as described above for the configuration sending device of the first aspect and its implementation forms.

A sixth aspect of this disclosure provides a method comprising the following steps:

- receiving, by a configuration receiving device from a configuration sending device, a device configuration, a unique ID associated with the device configuration, and a configurator ID identifying the configuration sending device;
- generating, by the configuration receiving device, a configuration metadata of the device configuration; and
- storing, by the configuration receiving device, the configuration metadata in combination with the unique ID and the configurator ID.

In an implementation form of the sixth aspect, the unique ID may comprise a transaction ID.

In an implementation form of the sixth aspect, the configuration metadata may comprise one or more of:

- a configuration ID,
- a timestamp,
- user information, and
- a method for performing the device configuration.

In an implementation form of the sixth aspect, the configuration receiving device may be a network controller adapted to receive the device configuration from a network orchestration entity as the configuration sending device.

In an implementation form of the sixth aspect, the configuration receiving device may be a network element adapted to receive the device configuration from a network controller as the configuration sending device.

The method of the sixth aspect and its implementation forms may achieve the same advantages and effects as described above for the configuration receiving device of the second aspect and its implementation forms.

A seventh aspect of this disclosure provides a computer program comprising instructions which, when the program is executed by a computer, cause the computer to perform the method according to the fifth aspect or any of its implementation forms.

An eighth aspect of this disclosure provides a computer program comprising instructions which, when the program is executed by a computer, cause the computer to perform the method according to the sixth aspect or any of its implementation forms.

A ninth aspect of this disclosure provides a non-transitory storage medium storing executable program code which, when executed by a processor, causes the method according to the fifth aspect or any of its implementation forms to be performed.

A tenth aspect of this disclosure provides a non-transitory storage medium storing executable program code which, when executed by a processor, causes the method according to the sixth aspect or any of its implementation forms to be performed.

It has to be noted that all devices, elements, units, and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of embodiments, a functionality or step to be performed by external entities is not reflected in the description of a detailed element of that entity which performs that step or functionality, it should be clear for a skilled person that these methods and functionalities can be implemented in respective software or hardware elements, or any kind of combination thereof.

BRIEF DESCRIPTION OF DRAWINGS

The above-described aspects and implementation forms will be explained in the following description of embodiments in relation to the enclosed drawings, in which.

DETAILED DESCRIPTION OF EMBODIMENTS

Embodiments of the present disclosure may be used for various networks, such as but not limited to a network based on software-defined networking (SDN), an autonomous network, and an autonomous driving network (ADN). Embodiments of this disclosure may be generally applied to any network configuration protocol, such as but not limited to NETCONF and RESTCONF protocols.

The present disclosure generally relates to tracing device configuration changes within a network. In the present disclosure, a configuration sending device may be simply referred to as a client, and a configuration receiving device may be simply referred to as a server.

Figure 1:
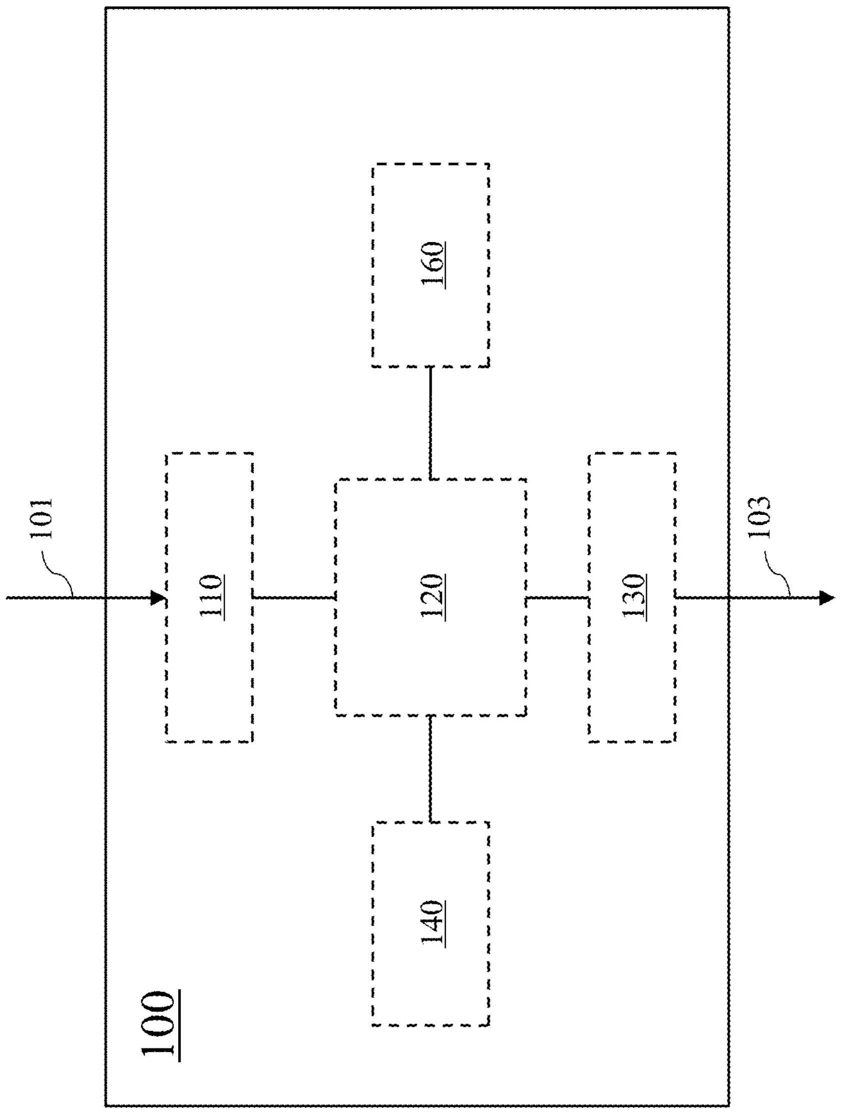
FIG. 1 shows a configuration sending device according to an embodiment of this disclosure.

FIG. 1 shows a client 100 according to the present disclosure. The client 100 is configured to generate a device configuration based on configuration data 101. Then, the client is configured to send the device configuration to a server.

In order to keep a record of the configuration data 101, the client is further configured to generate configuration metadata of the configuration data 101. The configuration metadata may be part of a device configuration history, in which the client 100 keeps a history of configuration changes.

The client 100 is further configured to generate a unique ID. The client 100 is further configured to store the configuration metadata in combination with the unique ID. Optionally, the unique ID may be an ID that is at least unique to the client. That is, the unique ID may be an ID that uniquely identifies the configuration data and/or the configuration metadata on the client. For example, in response to received configuration data, client A pushes device configurations to server B and server C. Client A and server B may share a unique ID with value 1. Client A and server C can also share the same unique ID with value 1. In this case, from both server B and server C, the pushed device configurations can be both traced back to the corresponding configuration metadata stored on client A based on the combination of (client ID A, unique ID 1).

Alternatively, the unique ID may be unique within the network. For example, when client A and server B share a unique ID with value 1, then another unique ID with value 2 shall be used between client A and server C. In this case, the client 100 may be configured to store the configuration metadata in combination with two or more unique IDs.

The client 100 is further configured to send the device configuration 103, the unique ID, and a client ID to the server.

It is noted that the device configuration, the unique ID, and the client ID may be sent in a single message 103, or separate messages (not shown in FIG. 1).

It is further noted that the client 100 may be configured to store the configuration metadata in combination with the unique ID after sending the device configuration 103 to the server. In some optional cases, e.g., a two-phase commit protocol, the client 100 may be configured to wait for a confirmation from the server that the device configuration 103 has been successfully applied. After the confirmation is received, the client 100 may be configured to store the configuration metadata in combination with the unique ID. Optionally, when there are two or more servers, the client 100 may be configured to wait for confirmations from all of the servers to be received, and then store the configuration metadata in combination with the unique ID.

Optionally, the unique ID may be a transaction ID. The transaction ID may be an extension of NETCONF protocol to keep synchronization between the server and the client. The unique ID stored by the client 100 may be referred to as a southbound ID, or a southbound transaction ID, in its device configuration history, when stored in combination with the configuration metadata.

Optionally, the client ID may be, e.g., a MAC address of the client, an IP address of the client, a hardware ID of the client, or a network ID of the client.

For example, a single message 103 sent by the client 100 to the server may be an IP packet. The IP packet may comprise the MAC address of the client 100 in the header field, which may be indirectly used as the client ID. The payload of the IP packet may comprise the device configuration and the unique ID. Optionally, the payload of the IP packet may further comprise the client ID directly. The device configuration, the unique ID, and the client ID may be in a format of extensible markup language (XML) or JavaScript object notation (JSON). Optionally, YANG data modeling language, which is in an XML tree format, may be used to send the device configuration, the unique ID, and the client ID.

Optionally, the client 100 may comprise a receiving module 110, a sending module 130, a processor 120, a memory 140, and a storage medium 160. The receiving module 110 may be configured to receive the configuration data 101. The sending module 130 may be configured to send the device configuration 103, the unique ID, and the client ID. The memory 140 may be configured to store instructions, which when executed by the processor 120, cause the client 100 to perform the device configuration generation, configuration metadata generation, unique ID generation, and other related steps. The storage medium 160 may be a long-term storage adapted to store the configuration metadata in combination with the unique ID. The long-term storage may comprise non-volatile memory such as a hard disk drive, a solid-state drive, and/or a flash memory.

Optionally, the receiving module 110 may be referred to as a "northbound interface", and the sending module 130 may be referred to as a "southbound interface". The receiving module 110 and the sending module 130 may be part of a transceiver module.

Optionally, the northbound interface may be adapted to communicate with a network device of a higher level, while the southbound interface may be adapted to communicate with a network device of a lower level.

Figure 2:
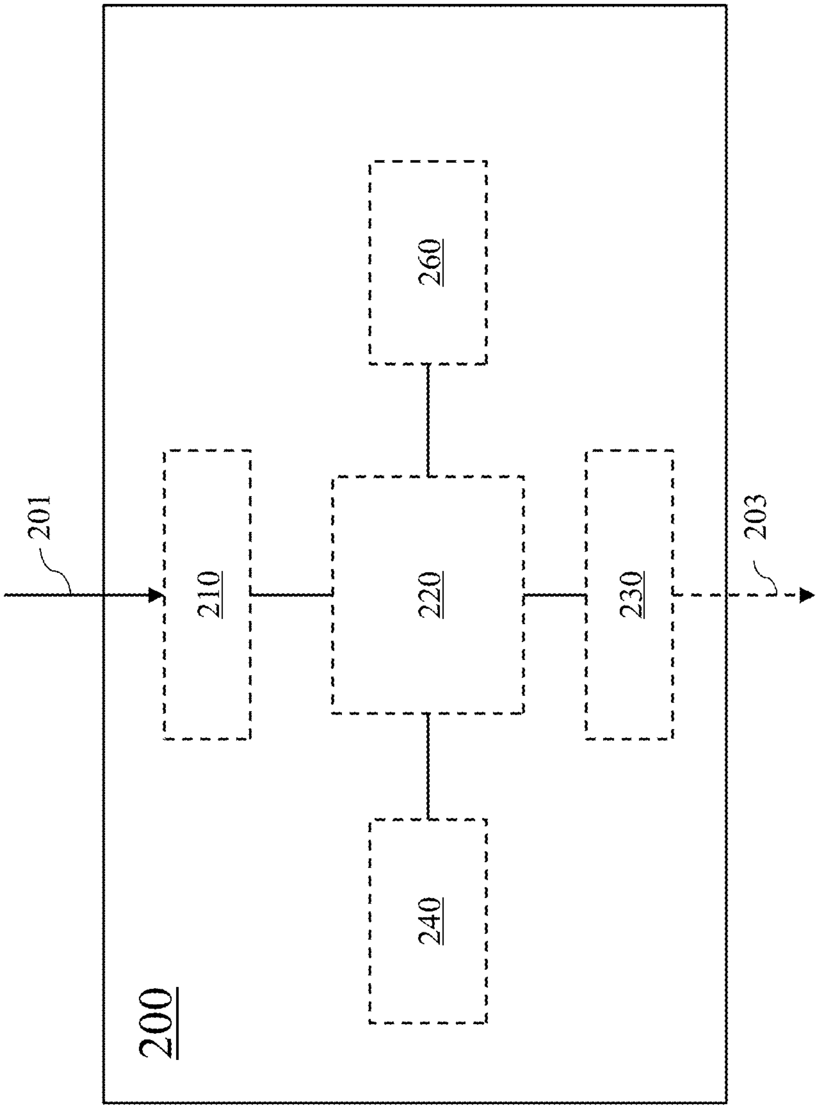
FIG. 2 shows a configuration receiving device according to an embodiment of this disclosure.

FIG. 2 shows a server 200 according to the present disclosure. The server 200 is configured to receive a device configuration, a unique ID associated with the device configuration, and a client ID from a client, e.g., the client 100 of FIG. 1. Optionally, the device configuration, the unique ID, and the client ID may be received in a single message 201, which corresponds to the message 103 of FIG. 1. Corresponding elements may share the same features and functions likewise.

In order to keep a record of the received device configuration, the server 200 is further configured to generate configuration metadata of the received device configuration. The configuration metadata may be part of a device configuration history, in which the server 200 keeps a history of configuration changes.

Then, the server 200 is configured to store the configuration metadata in combination with the unique ID. Optionally, the unique ID may be a transaction ID. The unique ID received from the client and stored by the server 200 may be referred to as a northbound ID in the device configuration history of the server 200, when stored in combination with the configuration metadata.

Optionally, a device configuration change may have a chain reaction in the network. That is, if the server 200 is coupled to a further network device of a lower level, then, the server 200 may act as a client illustrated in FIG. 1 for the further network device and provide a further device configuration, a further unique ID, and the ID of the server 200 in a further message 203 to the further network device. That is, the client 100 of FIG. 1 and the server 200 of FIG. 2 may be cascaded.

Optionally, the server 200 may comprise a receiving module 210, a sending module 230, a processor 220, a memory 240, and a storage medium 260. The receiving module 210 may be configured to receive the device configuration, the unique ID, and the client ID. The sending module 230 may be configured to send the further message 203 to the network device of a lower level. The memory 240 may be configured to store instructions, which when executed by the processor 220, cause the server 200 to perform configuration metadata generation and other related steps. The storage medium 260 may be a long-term storage adapted to store the configuration metadata in combination with the unique ID and the client ID. The long-term storage may comprise non-volatile memory such as a hard disk drive, a solid-state drive, and/or a flash memory.

Optionally, the receiving module 210 may be referred to as a "northbound interface", and the sending module 230 may be referred to as a "southbound interface". The receiving module 210 and the sending module 230 may be part of a transceiver module.

Optionally, the northbound interface may be adapted to communicate with a network device of a higher level, e.g., the client of FIG. 1, while the southbound interface may be adapted to communicate with a network device of a lower level.

Figure 3:
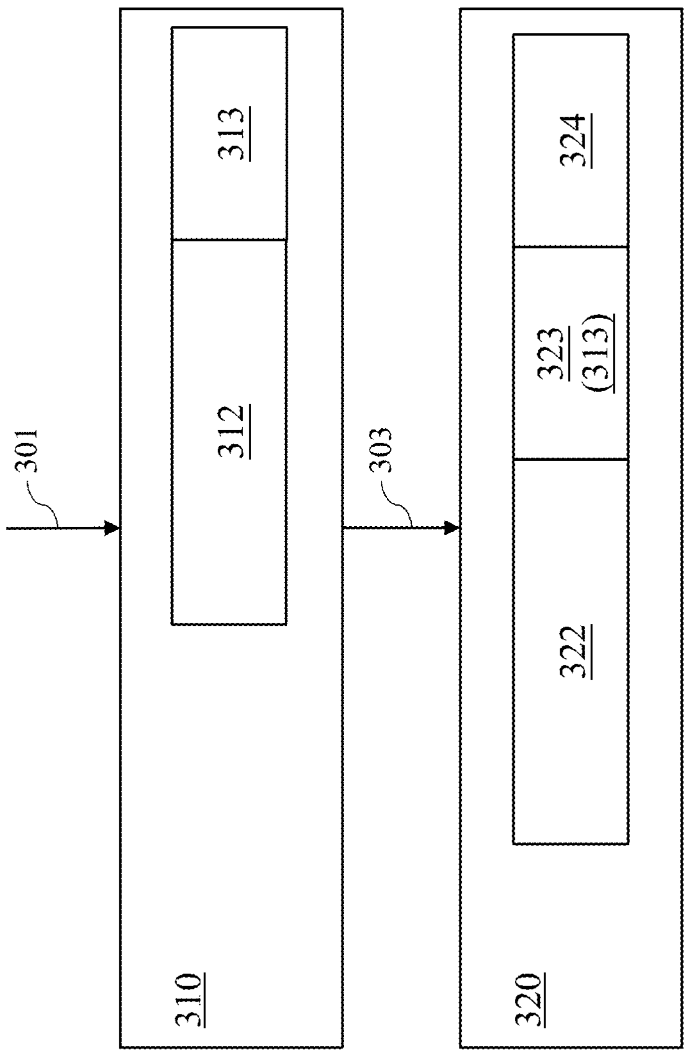
FIG. 3 shows an example of a network according to an embodiment of this disclosure.

FIG. 3 shows an example of a network according to the present disclosure. The network comprises a client 310 and a server 320. The client 310 is built based on the client 100 of FIG. 1, and the server 320 is built based on the server 200 of FIG. 2. Corresponding elements may share the same features and functions likewise.

A network, e.g., an SDN, may comprise network devices such as an orchestrator, a controller, and a network element. The orchestrator may be a network entity that is adapted to receive a service request and implement the service request by configuring southbound systems such as controllers and network elements. The controller may be a network entity that is configured by a northbound system such as an orchestrator, and adapted to configure southbound systems such as network elements and other controllers. Either the orchestrator or the controller may be referred to as an NMS. The network element may be referred to as equipment involved in the data transmission of the network, and can be configured by an NMS. For example, the network element may be a router or a switch.

In a first possible case, the client 310 may be the orchestrator, and the server 320 may be the controller. The orchestrator may be configured to receive configuration data 301, e.g., from a customer or a service provider. The configuration data 301 may comprise a service request. The service request may indicate operational and deployment requirements of a service. For instance, the service request may indicate modifying, adding, or removing a service.

Then, the orchestrator is configured to generate configuration metadata 312 of the configuration data 301. The configuration metadata 312 may comprise a configuration ID uniquely identifying the configuration data 301 on the orchestrator, a timestamp of when the configuration data 301 is received, and user information about who provides the configuration data 301.

Then, the orchestrator is configured to generate a device configuration of the controller based on the configuration data. The orchestrator may be configured to generate a unique ID 313. The unique ID 313 may be a transaction ID, which may be used as a version number to keep configuration synchronization between the orchestrator and the controller. This transaction ID is unique within the orchestrator. Optionally, the orchestrator may be configured to use the configuration ID as the transaction ID, since both of them are unique within the orchestrator. That is, generally speaking, in this disclosure, optionally, the value of the configuration ID may be used as the value of the unique ID or the transaction ID.

Then, the orchestrator is configured to store the unique ID 313 in combination with the configuration metadata 312.

The orchestrator is configured to send the unique ID 313 (e.g., the transaction ID), the device configuration, and an orchestrator ID to the controller, e.g., via a single message 303. It is noted that the unique ID 313 sent to a network device of a lower level (e.g., the server 320) may be referred to as a southbound ID 313 of the client 310.

The controller as the server 320 is then configured to receive the device configuration, the unique ID 313, and the orchestrator. It is noted that the unique ID 313 received from a network device of a higher level (e.g., the client 310) may be referred to as a northbound ID 323 of the server 320.

Then, the controller is configured to generate configuration metadata 322 of the device configuration, and store the generated configuration metadata 322 in combination with the northbound ID 323 and the orchestrator ID 324. This northbound ID 323 stored on the controller corresponds to the southbound ID 313 stored on the orchestrator. Thus, a mapping relationship can be created, and device configuration changes can be traced.

The configuration metadata 322 of the controller may comprise a configuration ID uniquely identifying the device configuration on the controller, a timestamp of when the device configuration is received or applied, user information about who applied the device configuration, and a method used to apply the device configuration.

In a second possible case, the client 310 may be a controller, and the server 320 may be a network element. The controller may be configured to receive the configuration data 301 from the orchestrator. The configuration data 301 may comprise a device configuration of the controller. The controller may be configured to apply the device configuration, and translate the device configuration into a device configuration of the network element.

Other aspects of the second possible case shall be similar to the first possible case, which are not repeated herein.

Figure 4:
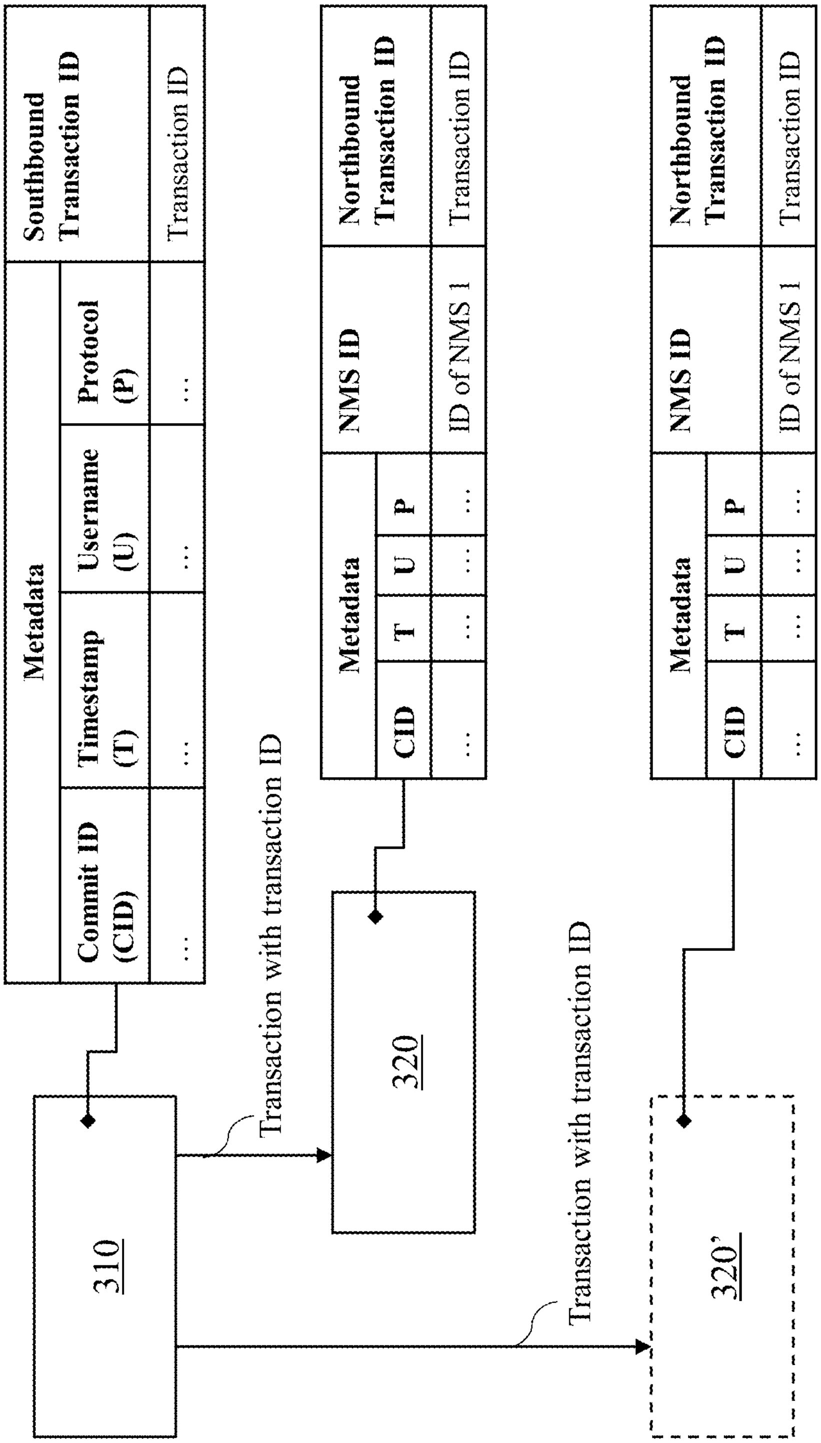
FIG. 4 shows an example of a configuration history stored on network devices according to an embodiments of this disclosure.

FIG. 4 illustrates an example of a configuration history on network devices according to this disclosure. FIG. 4 corresponds to FIG. 3, and illustrates one client 310 and two servers 320, 320'. A single northbound transaction received by the client 310 may trigger the configurations of both servers 320, 320'. It is noted that the network of the present disclosure may comprise at least one server and at least one client.

It can be seen that in FIG. 4, in the configuration history of the client 310, a southbound transaction ID is stored in combination with corresponding configuration metadata. Correspondingly, in the configuration history of the server 320, 320', a northbound transaction ID is stored in combination with corresponding configuration metadata. The southbound ID of the client 310 and the northbound ID of the server 320, 320' correspond to each other. This may create a mapping relationship between the configuration data of the client 310, and the device configuration of the server 320, 320', which facilitates the RCA within the network.

Figure 5:
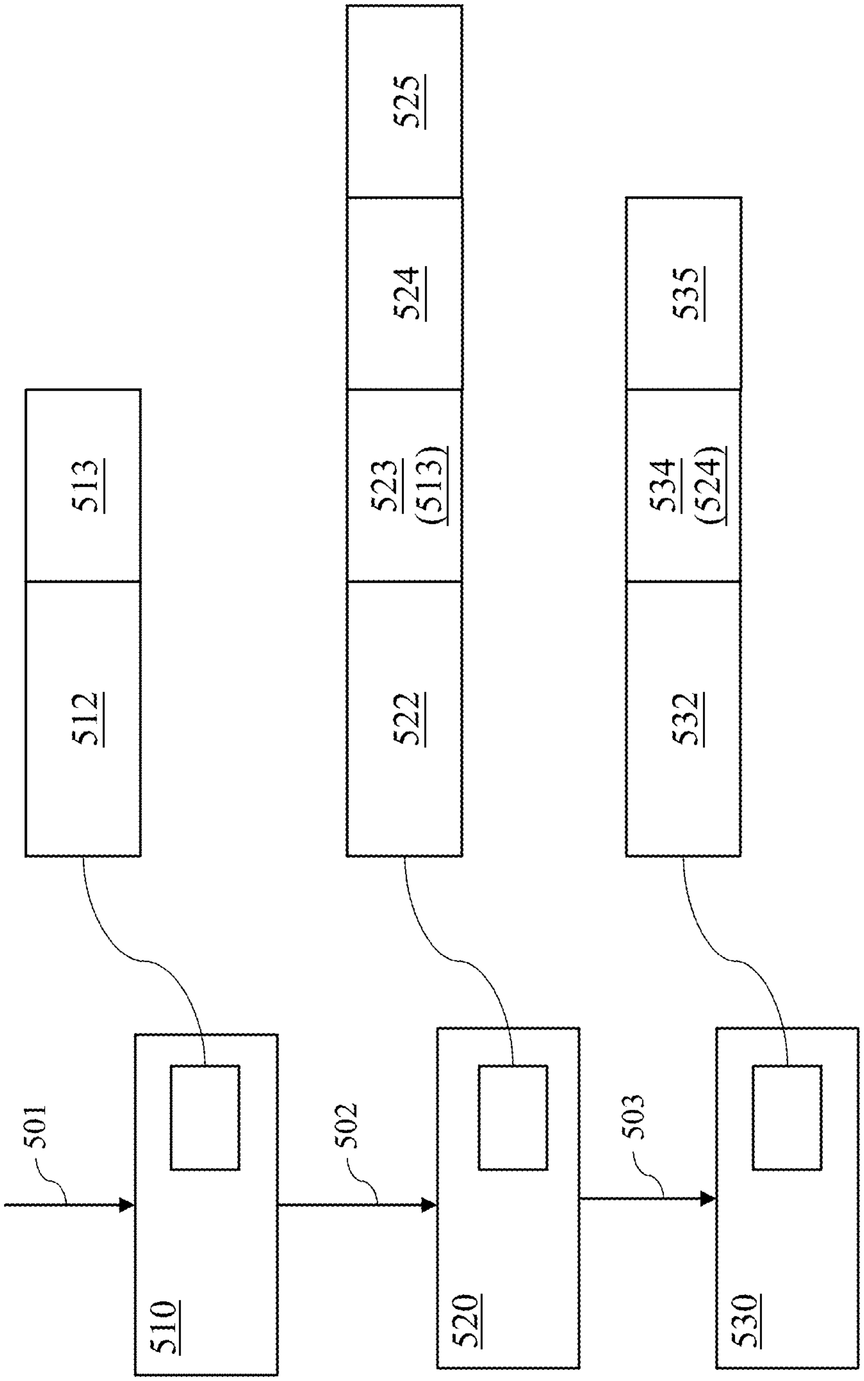
FIG. 5 shows a further example of a network according to an embodiment of this disclosure.

FIG. 5 shows a further example of a network according to the present disclosure. The network comprises at least one orchestrator 510, at least one controller 520, and at least one network element 530.

FIG. 5 illustrates a cascaded situation of the first possible case and the second possible case of FIG. 3. Therefore, corresponding elements may share the same functions and features likewise.

Specifically, the orchestrator 510 is configured to obtain a service request as configuration data 501, and generate a device configuration 502 of the controller 520. The orchestrator 510 is configured to generate a first transaction ID as a first southbound ID 513, and first configuration metadata 512. The first southbound ID 513 is stored in combination with the first configuration metadata 513.

After receiving the device configuration 502, the first transaction ID, and an orchestrator ID, the controller 520 is configured to generate a second configuration metadata 522 of the device configuration. The first transaction ID received from the orchestrator 510 is stored by the controller 520 as a first northbound ID 523 in combination with the second configuration metadata 522 and the orchestrator ID 525. The first southbound ID 513 corresponds to the first northbound ID 523. That is, both of them comprise a same unique ID, i.e., the first transaction ID.

Then, the controller 520 further acts as a client for the network element 530. That is, the controller 520 is further configured to translate its device configuration 502 into a device configuration 503 of the network element 530. Then, a second transaction ID is generated by the controller 520.

Then, the controller 520 is configured to store the second transaction ID as a second southbound ID 524 in combination with the second configuration metadata 522. As a result, both of the first northbound ID 523 and the second southbound ID 524 may be stored in combination with the second configuration metadata 522.

Then, the controller 520 is configured to send the second transaction ID, the device configuration 503 of the network element 530, and a controller ID to the network element 530. The network element 530 is configured to generate a third configuration metadata 532 accordingly, and store the second transaction ID as a third northbound ID 534 in combination with the third configuration metadata 532 and the controller ID 535. The third northbound ID 534 corresponds to the second southbound ID 524. That is, both of them comprise a same unique ID, i.e., the second transaction ID.

In this way, the unique ID shared between a server and a client may provide a mapping relationship. The device configuration 503 of the network element 530, which corresponds to the third configuration metadata 532, may be traced back to the service request, which corresponds to the first configuration metadata 512, through the first transaction ID and the second transaction ID.

It is noted that in the present disclosure, the place or the order of storing the northbound ID, the southbound ID, and the configuration metadata is not strictly limited, as long as they are stored in a single record of a corresponding device configuration history.

Figure 6:
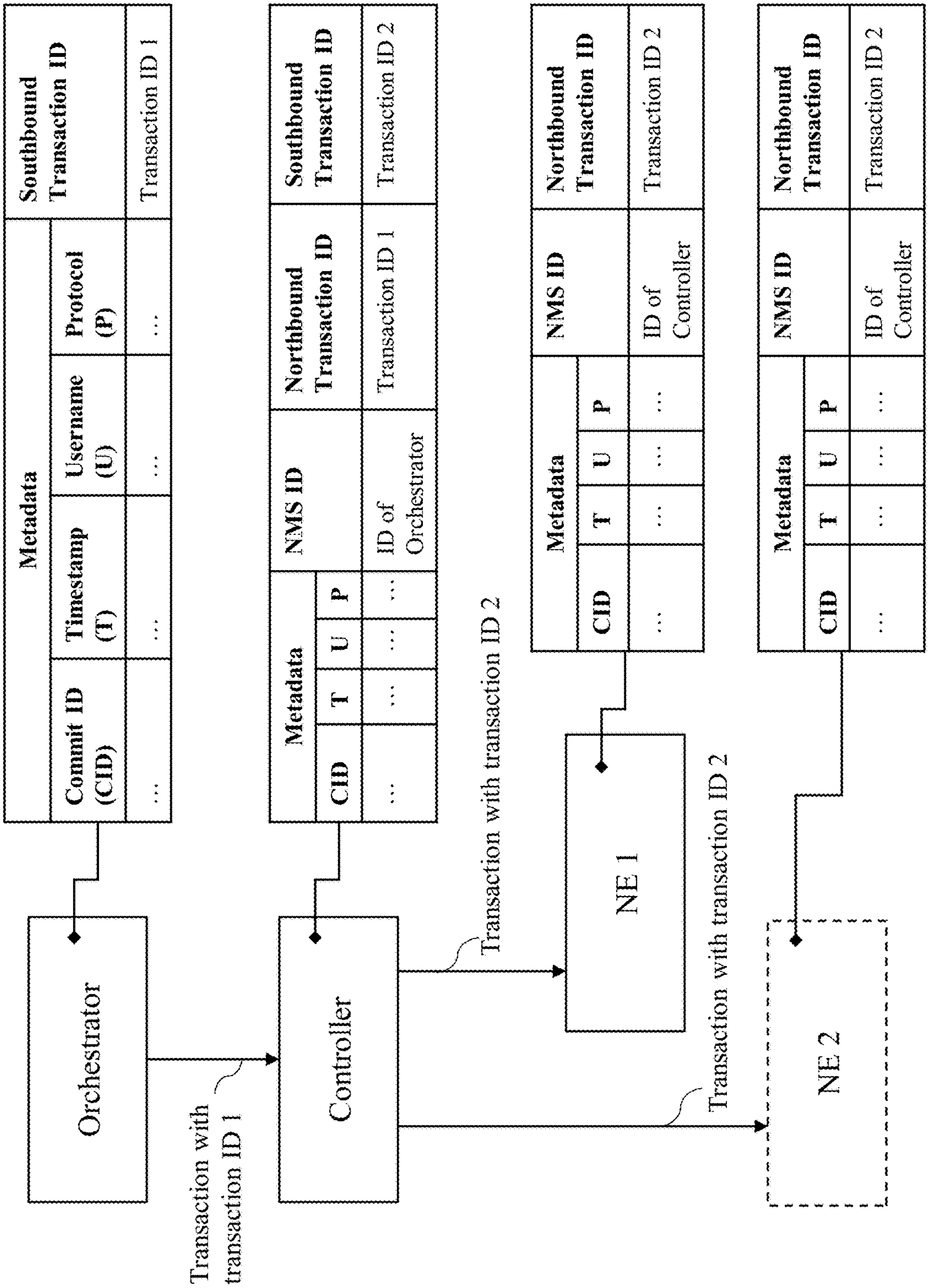
FIG. 6 shows a further example of a configuration history stored on network devices according to an embodiment of this disclosure.

FIG. 6 illustrates a further example of a configuration history on network devices according to this disclosure. FIG. 6 corresponds to FIG. 5, and illustrates one orchestrator, one controller, and two network elements (NE 1 and NE 2) as an example.

It can be seen that, in FIG. 6, based on the Transaction ID 2 stored in the NE 1 (or NE 2), it can be traced back all the way up to the Transaction ID 1 stored in the orchestrator. Then, a corresponding configuration data stored on the orchestrator may be determined and the root cause triggering the device configuration on the NE 1 or NE 2 can be determined. The root cause may be an automatic request generated within the network, or a manual request input by an external entity outside the network.

Figure 7:
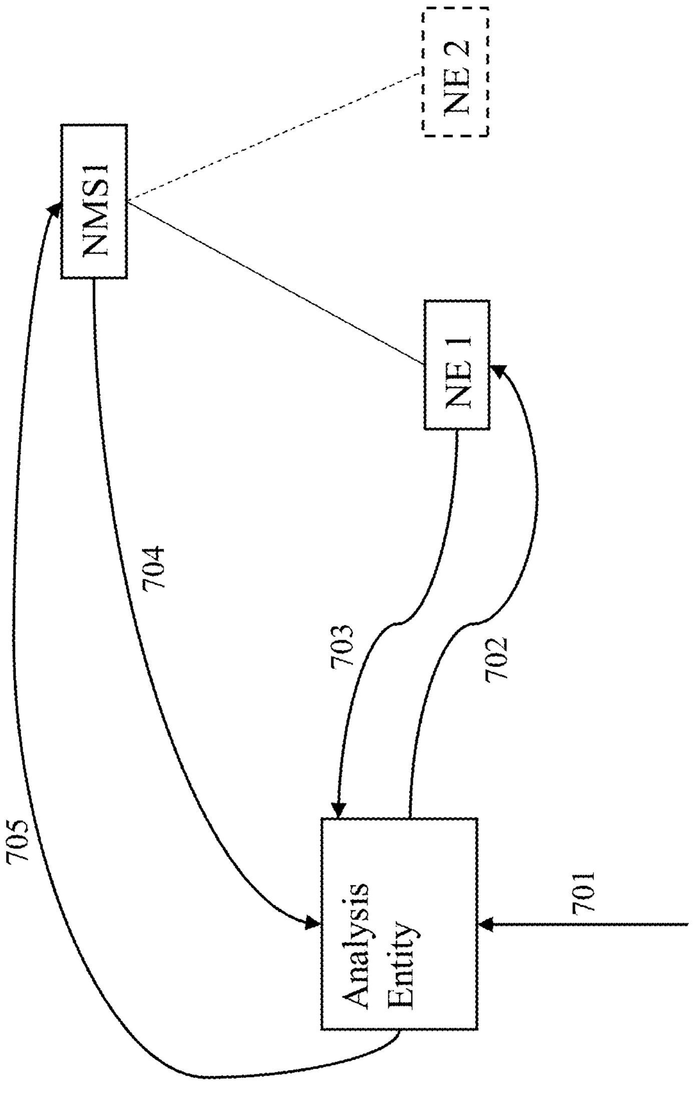
FIG. 7 shows an example of a self-healing procedure according to an embodiment of this disclosure.

FIG. 7 shows a use of a system for tracking device configuration changes according to this disclosure. The system comprises one network management system (NMS 1) as a client, two network elements (NE 1 and NE 2) as servers, and an RCA entity for supporting automatic resolution of configuration issues.

The Use May Comprise the Following Steps:

Step 701: detecting malfunction over NE 1 and NE 2;

Step 702: sending a request for querying recent configuration changes, e.g., the last configuration change before the time of the malfunction;

Step 703: obtaining northbound transaction ID and NMS ID;

Step 704: obtaining the configuration data on the NMS 1 based on the northbound transaction ID (corresponding to the southbound transaction ID on NMS 1) and NMS ID; and Step 705: resolving configuration issue by closed-loop automation.

In this way, automatic resolution of configuration issues can be achieved, and self-healing of the network can be provided.

Figure 8:
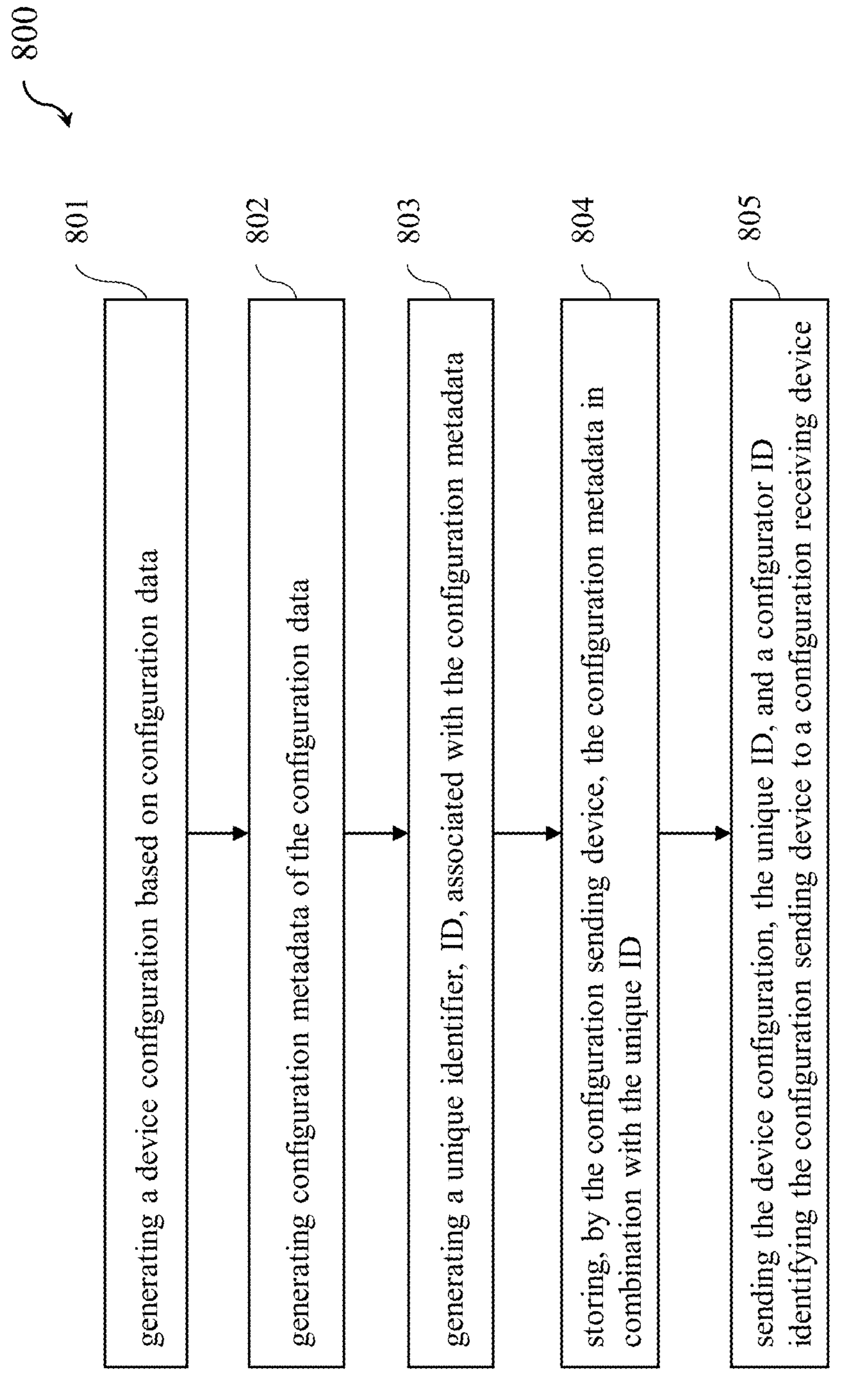
FIG. 8 shows a diagram of a method regarding tracing device configurations according to an embodiment of the present disclosure.

FIG. 8 shows a diagram of a method 800 of the present disclosure. The method 800 comprises the following steps:

step 801: generating, by a configuration sending device, a device configuration based on configuration data;

step 802: generating, by the configuration sending device, a configuration metadata of the configuration data;

step 803: generating, by the configuration sending device, a unique ID associated with the configuration metadata;

step 804: storing, by the configuration sending device, the configuration metadata in combination with the unique ID; and step 805: sending, by the configuration sending device, the device configuration, the unique ID, and a configurator ID identifying the configuration sending device to a configuration receiving device.

It is noted that the order for performing steps 801, 802, and 803 may be exchanged. The order for performing steps 804 and 805 may be exchanged.

Optionally, the method may comprise:

Step 806: receiving, by the configuration sending device from the configuration receiving device, a confirmation that the sent device configuration is successfully applied.

In this case, step 804 may be executed after the confirmation is received. That is, steps 804, 805, 806 may be executed in this order: step 805, step 806, step 804.

The steps of the method 800 may share the same functions and details from the perspective of FIG. 1-7 described above for the client. Therefore, the corresponding method implementations are not described again at this point.

Figure 9:
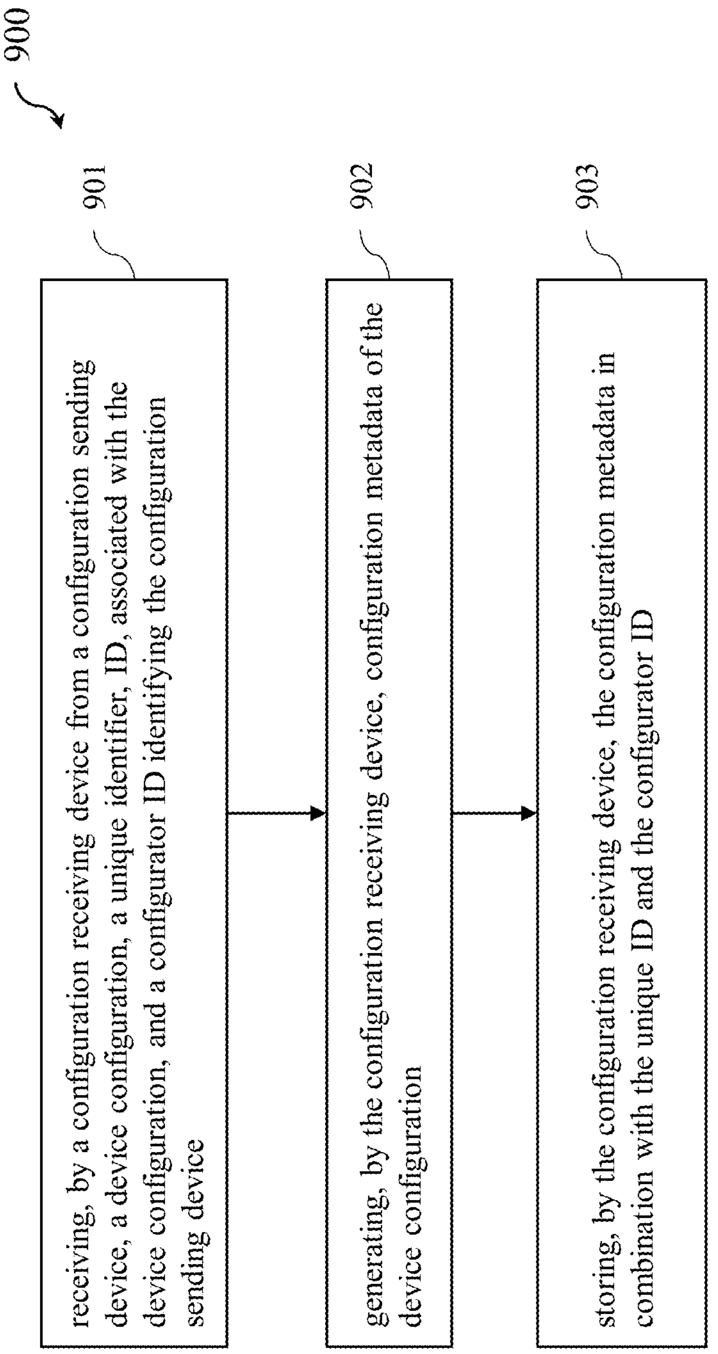
FIG. 9 shows a diagram of a further method regarding tracing device configurations according to an embodiment of the present disclosure.

FIG. 9 shows a diagram of a method 900 of the present disclosure. The method 900 comprises the following steps:

step 901: receiving, by a configuration receiving device from a configuration sending device, a device configuration, a unique identifier, ID, associated with the device configuration, and a configurator ID identifying the configuration sending device; and step 902: generating, by the configuration receiving device, a configuration metadata of the device configuration; and step 903: storing, by the configuration receiving device, the configuration metadata in combination with the unique ID and the configurator ID.

The steps of the method 900 may share the same functions and details from the perspective of FIG. 1-7 described above for the server. Therefore, the corresponding method implementations are not described again at this point.

In the present disclosure, the transaction ID may be used by a NETCONF server to check whether the configuration on the client has been changed or not, and thus avoid a full synchronization cycle. The transaction ID may be an optimal candidate for the unique ID of the present disclosure. By recording the transaction ID on both ends (i.e., the client and the server) of each transaction, and exploiting the transaction records to match the configuration change applied to the server with the original configuration data on the client that triggered the device configuration change. Optionally, the configuration ID generated on the client may be re-used as the transaction ID.

For example, in a scenario where an orchestrator configures a controller, and the controller configures a network element, the orchestrator generates a transaction ID for Transaction #1 and saves it as the southbound transaction ID. The service request that triggered the Transaction #1, and the generated transaction ID (southbound transaction ID) are saved as a single record in the configuration history of the orchestrator. Then, the orchestrator sends the generated transaction ID in Transaction #1, with its own ID and a device configuration of the controller.

After receiving Transaction #1, the controller saves the transaction ID of Transaction #1 as the northbound transaction ID and generates a further transaction ID for Transaction #2 for the network element. The metadata of the device configuration of the controller, as well as the northbound ID, the southbound ID, and the ID of the orchestrator are saved as a single record in the configuration history of the controller. The controller sends the generated further transaction ID in Transaction #2, with its own ID and a device configuration of the network element.

After receiving Transaction #2, the network element records the applied change by saving the metadata of its device configuration, the northbound ID (the further transaction ID), and the ID of the controller as a single record in the configuration history of the network element.

In order to trace a configuration change on the network element to the original service request, an analysis entity may perform the following steps:

querying the configuration history of the network element to find the record containing the configuration change, the northbound transaction ID (the further transaction ID), and the controller ID;

based on the controller ID, identifying the controller that pushed the configuration change;

querying the configuration history of the controller to obtain the record that has the ID of the further transaction ID as southbound transaction ID, and obtaining the corresponding orchestrator ID and northbound transaction ID (the transaction ID);

based on the orchestrator ID, identifying the orchestrator that pushed the configuration change;

querying the configuration history of the orchestrator to obtain the record that has the transaction ID as southbound transaction ID, and obtaining the original service request.

In this way, a configuration change applied to a network device of a lower level can be automatically mapped to configuration data in a network device of a higher level. Therefore, device configuration changes can be traced in the network.

In the present disclosure, the device (including the server and the client) may comprise a processor or processing circuitry (not shown) configured to perform, conduct or initiate the various operations of the device described herein. The processing circuitry may comprise hardware and/or the processing circuitry may be controlled by software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. The device may further comprise memory circuitry, which stores one or more instruction(s) that can be executed by the processor or by the processing circuitry, for example, under control of the software. For instance, the memory circuitry may comprise a non-transitory storage medium storing executable software code which, when executed by the processor or the processing circuitry, causes the various operations of the device to be performed. In one embodiment, the processing circuitry comprises one or more processors and a non-transitory memory connected to the one or more processors. The non-transitory memory may carry executable program code which, when executed by the one or more processors, causes the device to perform, conduct or initiate the operations or methods described herein.

The present disclosure has been described in conjunction with various embodiments as examples as well as implementations. However, other variations can be understood and effected by those persons skilled in the art and practicing the claimed matter, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A configuration sending device, comprising:
- a processor; and
- a memory coupled to the processor and having processor-executable instructions stored thereon, which upon execution of the processor, facilitate the configuration sending device to:
- generate a device configuration based on configuration data;
- generate configuration metadata of the configuration data;
- generate a unique identifier (ID) associated with the configuration metadata;
- store the configuration metadata in combination with the unique ID; and
- send the device configuration, the unique ID, and a configurator ID identifying the configuration sending device to a configuration receiving device.

2. The configuration sending device according to claim 1, wherein the unique ID comprises a transaction ID.

3. The configuration sending device according to claim 1, wherein the configuration data comprises a service request.

4. The configuration sending device according to claim 1, wherein the configuration metadata comprises one or more of:
- a configuration ID,
- a timestamp,
- user information, and
- a method for performing the device configuration.

5. The configuration sending device according to claim 1, wherein the configuration sending device is a network orchestration entity adapted to send the device configuration to a network controller as the configuration receiving device.

6. The configuration sending device according to claim 1, wherein the configuration sending device is a network controller adapted to send the device configuration to a network element as the configuration receiving device.

7. A configuration receiving device, comprising:
- a processor; and
- a memory coupled to the processor and having processor-executable instructions stored thereon, which upon execution of the processor, facilitate the configuration sending device to:
- receive, from a configuration sending device, a device configuration, a unique identifier (ID) associated with the device configuration, and a configurator ID identifying the configuration sending device;
- generate configuration metadata of the device configuration; and
- store the configuration metadata in combination with the unique ID and the configurator ID.

8. The configuration receiving device according to claim 7, wherein the unique ID comprises a transaction ID.

9. The configuration receiving device according to claim 7, wherein the configuration metadata comprises one or more of:
- a configuration ID,
- a timestamp,
- user information, and
- a method for performing the device configuration.

10. The configuration receiving device according to claim 7, wherein the configuration receiving device is a network controller adapted to receive the device configuration from a network orchestration entity as the configuration sending device.

11. The configuration receiving device according to claim 7, wherein the configuration receiving device is a network element adapted to receive the device configuration from a network controller as the configuration sending device.

12. A method comprising:
- generating, by a configuration sending device, a device configuration based on configuration data;
- generating, by the configuration sending device, a configuration metadata of the configuration data;
- generating, by the configuration sending device, a unique identifier (ID) associated with the configuration metadata;
- storing, by the configuration sending device, the configuration metadata in combination with the unique ID; and
- sending, by the configuration sending device, the device configuration, the unique ID, and a configurator ID identifying the configuration sending device to a configuration receiving device.

13. A method comprising:
- receiving, by a configuration receiving device from a configuration sending device, a device configuration, a unique identifier, ID, associated with the device configuration, and a configurator ID identifying the configuration sending device;
- generating, by the configuration receiving device, a configuration metadata of the device configuration; and
- storing, by the configuration receiving device, the configuration metadata in combination with the unique ID and the configurator ID.

14. A computer program comprising a program code for performing the method according to claim 12, when executed on a computer.

15. A computer program comprising a program code for performing the method according to claim 13, when executed on a computer.

* * * * *